US008904425B2

(12) United States Patent
Samant et al.

(10) Patent No.: US 8,904,425 B2
(45) Date of Patent: Dec. 2, 2014

(54) METHOD FOR CONTROLLING AND IMPLEMENTING BLACKOUT IN IPTV NETWORKS

(71) Applicant: General Instrument Corporation, Horsham, PA (US)

(72) Inventors: Niranjan R. Samant, Lansdale, PA (US); Erik J. Elstermann, Carlsbad, CA (US); Robert E. Mack, Collegeville, PA (US); Erik C. Metz, Chalfont, PA (US); Lawrence D. Vince, Lansdale, PA (US)

(73) Assignee: General Instrument Corporation, Horsham, PA (US)

( * ) Notice: Subject to any disclaimer, the term of this patent is extended or adjusted under 35 U.S.C. 154(b) by 13 days.

(21) Appl. No.: 13/862,310

(22) Filed: Apr. 12, 2013

(65) Prior Publication Data
US 2014/0282682 A1    Sep. 18, 2014

Related U.S. Application Data

(60) Provisional application No. 61/800,084, filed on Mar. 15, 2013.

(51) Int. Cl.
*H04N 7/16* (2011.01)
*H04N 21/262* (2011.01)
*H04N 21/647* (2011.01)

(52) U.S. Cl.
CPC ....... *H04N 21/26258* (2013.01); *H04N 21/647* (2013.01)
USPC .............................. 725/28; 725/25

(58) Field of Classification Search
None
See application file for complete search history.

(56) References Cited

U.S. PATENT DOCUMENTS

| 8,352,982 | B2 | 1/2013 | de Heer et al. | |
| 8,370,388 | B2 | 2/2013 | Kilday et al. | |
| 2007/0291944 | A1 | 12/2007 | Wingert et al. | |
| 2008/0066095 | A1* | 3/2008 | Reinoso | 725/28 |
| 2008/0168487 | A1* | 7/2008 | Chow et al. | 725/31 |
| 2009/0187938 | A1 | 7/2009 | De Heer et al. | |
| 2010/0124399 | A1* | 5/2010 | Sofos et al. | 386/46 |

(Continued)

FOREIGN PATENT DOCUMENTS

CN    102546609 A    7/2012

OTHER PUBLICATIONS

PCT Search Report & Written Opinion, RE: Application #PCT/US2014/022155; dated Jul. 4, 2014.

(Continued)

*Primary Examiner* — Oschta Montoya
(74) *Attorney, Agent, or Firm* — Thomas A. Ward

(57) ABSTRACT

A media content broadcast blackout control method, comprising receiving a retune message requesting a blackout of a primary media content broadcast in specific regions, generating a playlist for each region comprising a content key wrapped in a region-specific media key, wherein the content key in the playlists for regions that are not subject to the blackout is configured to access the primary media content broadcast, and the content key in the playlists for regions that are subject to the blackout is configured to access an alternate media content broadcast, providing the playlists to client devices within each region, providing the primary media content broadcast to client devices whose region-specific media key unwraps the content key for the primary media content broadcast, and providing the alternate media content broadcast to client devices whose region-specific media key unwraps the content key for the alternate primary media content broadcast.

8 Claims, 5 Drawing Sheets

(56) References Cited

U.S. PATENT DOCUMENTS

| | | | |
|---|---|---|---|
| 2010/0125867 A1 | 5/2010 | Sofos et al. | |
| 2011/0041147 A1* | 2/2011 | Piepenbrink et al. | 725/28 |
| 2012/0174150 A1 | 7/2012 | Reddy et al. | |
| 2013/0276018 A1* | 10/2013 | Walter et al. | 725/25 |
| 2014/0068260 A1* | 3/2014 | Oney et al. | 713/168 |

OTHER PUBLICATIONS

F. Hartung, et al., "DRM Protected Dynamic Adaptive HTTP Streaming", retrieved from URL <http://www.hartung.fh-aachen.de/publicactions/ACM_MMSys2011_p277.pdf> on Jun. 3, 2013.

* cited by examiner

METHOD FOR CONTROLLING AND IMPLEMENTING BLACKOUT IN IPTV NETWORKS

CLAIM OF PRIORITY

This Application claims priority under 35 U.S.C. §119(e) from earlier filed U.S. Provisional Application Ser. No. 61/800,084, filed Mar. 15, 2013, the entirety of which is herein incorporated by reference.

TECHNICAL FIELD

The present disclosure relates to the field of blacking out media content broadcasts, particularly a method of blacking out media content broadcasts in specific regions over Internet Protocol Television (IPTV) systems.

BACKGROUND

Content providers and/or service providers routinely provide media content broadcasts to client devices such as set-top boxes, mobile phones, personal computers, tablet computers, gaming consoles, and other devices. In some situations, a media content broadcast can be blacked out in one or more regions, such that the media content broadcast is not accessible by client devices within the blacked-out regions. By way of a non-limiting example, as an attempt to increase in-person attendance of a football game, a football league can request that a provider take steps to black out video broadcasts of the football game to client devices located within the geographic region in which the football game is being played, while not blacking out the broadcast in other regions in which viewers are not as likely to physically attend the game. In some situations, the primary media content broadcast can be blacked out and replaced with an alternate media content broadcast, such that viewers in the blacked-out region who attempt to access the blacked-out media content broadcast are instead presented with the alternate media content broadcast.

In traditional cable and broadcast television systems, blackouts can be controlled by service providers and/or content providers. When a provider chooses to blackout a particular media content broadcast in one or more blackout regions, the provider can send a retune message in-band to an integrated receiver-decoder (IRD) or blackout manager physically located in each blackout region, such that any client devices in the blackout region that attempt to access the media content broadcast instead receive an alternate media content broadcast. This system requires the physical presence of an IRD in each blackout region, and requires regional processing of each blacked-out media content broadcast, including reception, decryption, transcoding and packaging, encryption, multiplexing, and transmission.

Internet Protocol Television (IPTV) networks are increasingly common. In contrast to the regional processing of blacked-out media content broadcasts in traditional television systems, IPTV networks are often centralized such that most processing functions are performed at a central data center that feeds all regions directly. For example, IPTV networks can be centralized with edge-based distribution in which content intended for an end-user client device can be encrypted at the central data center, and be transmitted to the end-user client device directly over IP networks. The direct transmission of media content broadcasts from the central data center eliminates the need for an IRD to be physically present within each region. Some methods of blacking out media content broadcasts in IPTV systems have been developed, however they do not adequately prevent client devices in a blacked-out region from gaining access to the blacked-out media content broadcast.

SUMMARY

What is needed is a method of blacking out media content broadcasts over IPTV networks centrally for one or more regions that prevents client devices in blacked-out regions from accessing the blacked-out media content broadcast from other regions in which the media content broadcast is not being blacked-out. For example, the method should prevent a client device in a blacked-out region from using CGI/Web proxy servers to spoof its location in order to gain access to the blacked-out media content broadcast.

In one embodiment, the present disclosure provides a media content broadcast blackout control method comprising receiving a retune message from a provider, the retune message comprising a request for a blackout of a primary media content broadcast in one or more of a plurality of regions, generating a playlist for each of the plurality of regions, each playlist comprising a content key wrapped in a region-specific media key that is specific to the region associated with the playlist, wherein the content key in the playlists for regions that are not subject to the blackout is configured to access the primary media content broadcast, and wherein the content key in the playlists for regions that are subject to the blackout is configured to access an alternate media content broadcast, providing the playlist associated with each of the plurality of regions to one or more client devices within each of the plurality of regions, providing the primary media content broadcast to one or more client devices whose region-specific media key unwraps the content key for the primary media content broadcast, and providing the alternate media content broadcast to one or more client devices whose region-specific media key unwraps the content key for the alternate media content broadcast.

BRIEF DESCRIPTION OF THE DRAWINGS

Further details of the present invention are explained with the help of the attached drawings in which.

DETAILED DESCRIPTION

Figure 1:
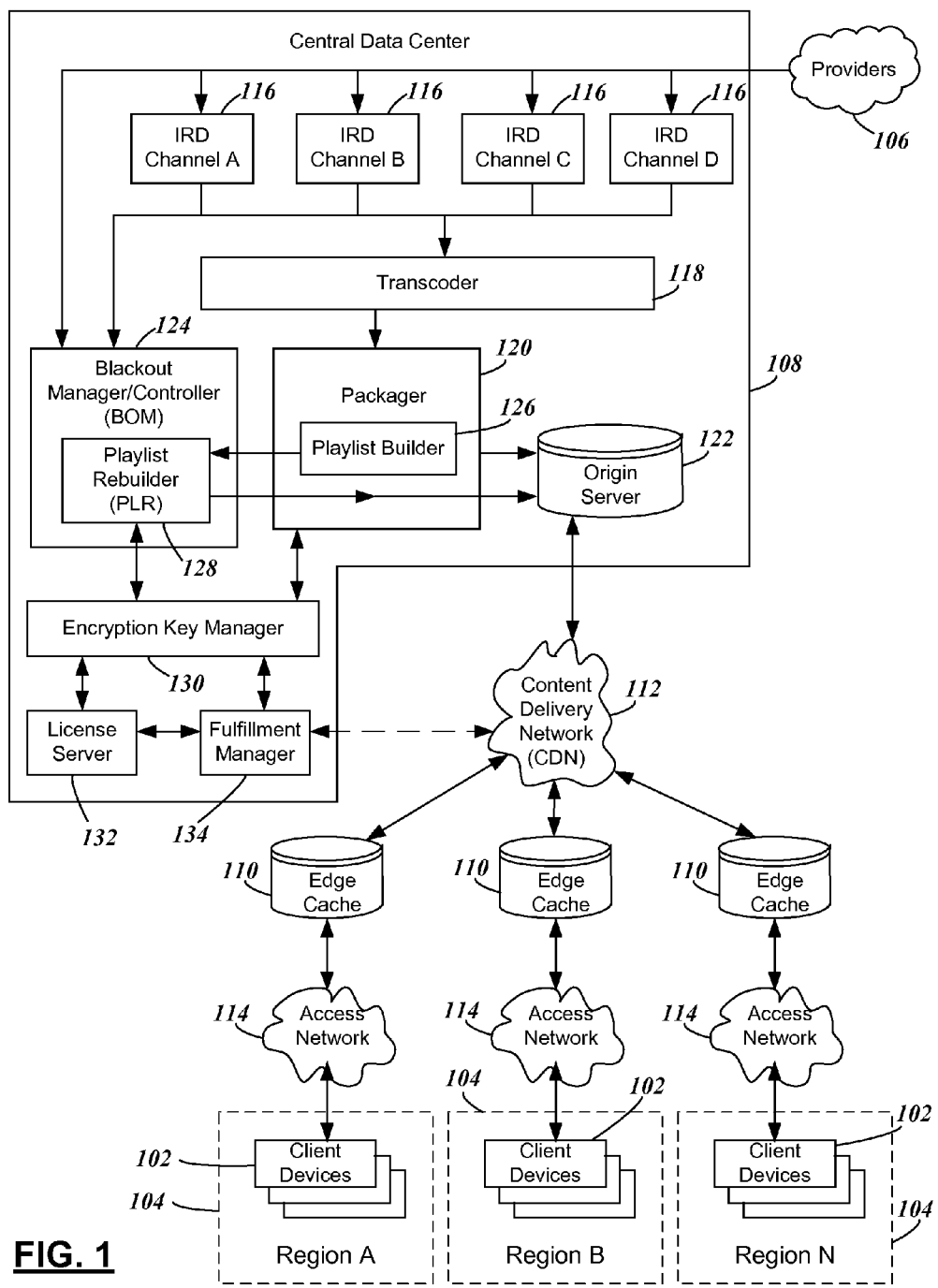
FIG. 1 depicts an embodiment of an operating environment for an Internet Protocol Television (IPTV) system that can be used to black out media content broadcasts to client devices in one or more regions.

FIG. 1 depicts an embodiment of an operating environment for an Internet Protocol Television (IPTV) system that can be used to black out media content broadcasts 210 to client devices 102 in one or more regions 104. Media content broadcasts 210 can be broadcasts, such as video broadcasts, that are sent from a content provider 106 to client devices over IP networks. In some embodiments, Adaptive Bitrate Streaming (ABR) can be used to transmit media content broadcasts 210. The client devices 102 can be set-top boxes, mobile phones, personal computers, tablet computers, gaming consoles, or any other devices configured to communicate over IP networks. The regions 104 can be geographic regions selected by the content provider 106 or a service provider that operates an IPTV service. Each client device 102 can be physically located within a single region 104.

The system can comprise a Central Data Center 108 in communication with one or more edge caches 110 through a Content Delivery Network (CDN) 112. The edge caches 110 can in turn be in communication with one or more client devices 102 in one or more regions 104 through one or more access networks 114. By way of a non-limiting example, FIG. 1 depicts an example of the Central Data Center 108 in communication with three regions 104, however the Central Data Center 108 can be in communication with any desired number of regions 104.

The Central Data Center 108 can comprise one or more integrated receiver-decoders (IRDs) 116, a Transcoder 118, a Packager 120, an Origin Server 122, and/or a Blackout Manager/Controller (BOM) 124. One or more media content broadcasts 210 can be received by the Central Data Center 108 from providers 106 via the IRDs 116. In some embodiments, the IRDs 116 can receive single-program transport streams (SPTS) that comprise a single media content broadcast 210, and/or a multi-program transport streams (MPTS) that comprise a plurality of media content broadcasts 210. By way of a non-limiting example, a sports broadcaster such as ESPN can have more than one television channel, and can transmit more than one channel as an MPTS, for example an MPTS that comprises media content broadcasts 210 for ESPN, ESPN2, ESPNU, and ESPN Classic.

The media content broadcasts 210 that are received from providers 106 can be decrypted at the receiving IRD 116, which can send the media content broadcast 210 to the Transcoder 118. At the Transcoder 118, the media content broadcast 210 can be multibitrate transcoded and be forwarded to the Packager 120.

The Packager 120 can break the media content broadcast 210 into chunks, and encrypt each chunk using a content key 206. The Packager 120 can change the content key 206 at regular or varying time intervals, such that the Packager 120 uses different content keys 206 at different times to encrypt media content broadcasts 210. In some embodiments, the Packager 120 can periodically rotate between a plurality of content keys 206. In alternate embodiments, the Packager 120 can periodically generate new content keys 206. The chunks can be encrypted such that they can be decrypted by client devices 102 that have access to the same content key 206 that was used during the encryption. The Packager 120 can send the encrypted chunks to the Origin Server 122.

The Packager 120 can also comprise a Playlist Builder 126 configured to generate an initial playlist. The initial playlist can be a manifest that lists the locations 208 of the encrypted chunks of the media content broadcast at the Origin Server 122. By way of a non-limiting example, the initial playlist can comprise a uniform resource locator (URL) for each encrypted chunk of the media content broadcast 210. The initial playlist can also comprise the content key 206 that was used to encrypt the chunks of the media content broadcast 210.

Figure 2A:
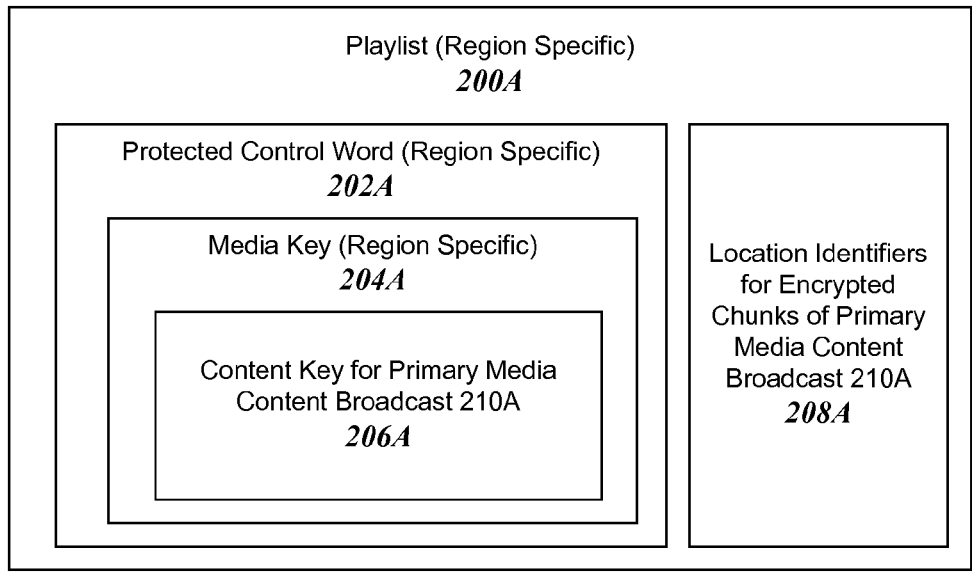
FIG. 2A depicts an embodiment of a region-specific playlist for a region that is not subject to a blackout of a primary media content broadcast.
Figure 2B:
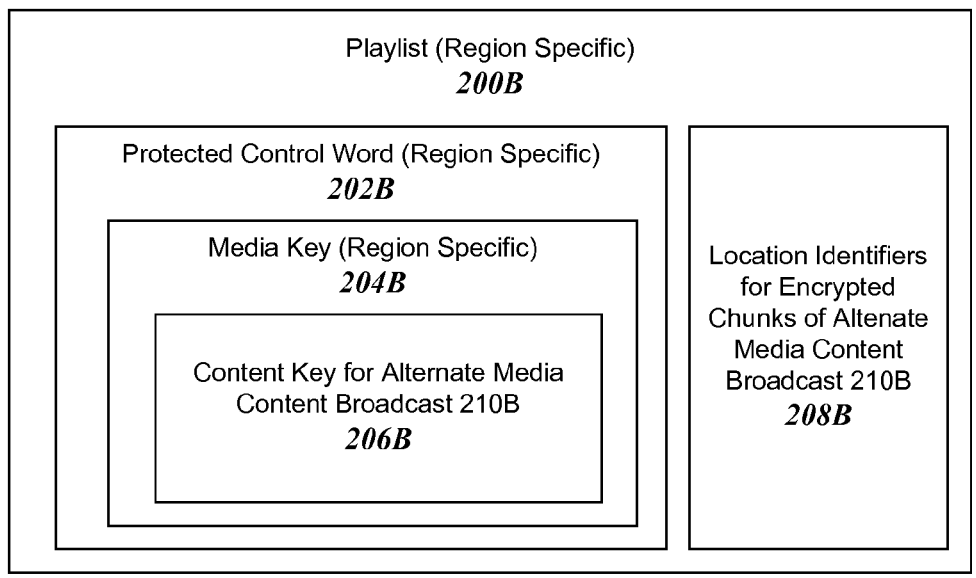
FIG. 2B depicts an embodiment of a region-specific playlist for a region that is subject to a blackout of a primary media content broadcast, and instead comprises information about an alternate media content broadcast.

The Blackout Manager 124 can comprise a Playlist Rebuilder (PLR) 128. The Playlist Rebuilder 128 can receive the initial playlist from the Playlist Builder 126, and use the received initial playlist to generate a region-specific playlist 200 for each region 104. FIGS. 2A and 2B depicts exemplary embodiments of region-specific playlists 200. Each region-specific playlist 200 can comprise a protected control word 202 that is unique to an individual region 104. The protected control word 202 can be located in key tag of the playlist 200, and can be a key blob comprising a content key 206 wrapped in a region-specific media key 204. The content key 206 can be the content key 206 that was used by the Packager 126 to encrypt the chunks of the media content broadcast, which can be the same for all regions 104. The region-specific media key 204 can be unique to each region 104. The region-specific playlist 200 can also comprise location identifiers 208 indicating the locations of the encrypted chunks of the media content broadcast 210 at the Origin Server 122, for example URLs.

The Playlist Rebuilder 128 can return each region-specific playlist 200 to the Packager 120, which can provide the region-specific playlists to the Origin Server 122. The Origin Server 122 can in turn provide the client devices 102 in each region 104 with the region-specific playlist 200 associated with that region 104. By way of a non-limiting example, with reference to FIG. 1, the Origin Server 122 can provide the client devices 102 in Region B with the region-specific playlist 200 generated by the Playlist Rebuilder 128 for Region B.

Each client device 102 can be provided with the media key 204 for the region 104 in which it is physically located. In some embodiments, the media key 204 can be specific to a media content broadcast 210, specific channel, and/or specific provider 106. In other embodiments, the media key 204 can be general for all media content broadcasts 210 within a particular region 104.

In some embodiments the Central Data Center 108 can further comprise an Encryption Key Manager 130, a License Server 132, and/or a Fulfillment Manager 134. The Fulfillment Manager 134 can be configured to obtain information about the geographic location of individual client devices 102. By way of a non-limiting example, a client device 102 can be a mobile phone comprising a GPS system, and the Fulfillment Manager can receive and use the client device's GPS coordinates to determine the region 104 in which the client device 102 is located. The License Server 132 can provide the client device 102 with the region-specific media key 204 for the region 104 in which it is physically located. In some embodiments, the Fulfillment Manager 134 can detect when the client device moves to a different region, such that the client device can be provided with the region-specific media key 204 for its current region 104. In some embodiments, the Encryption Key Manager 130 can provide content keys 206 and/or protected code words 202 to the Packager 120.

In some embodiments, the License Server 132 can further determine whether the client device 102 should receive a region-specific media key 206. By way of a non-limiting example, the License Server 132 can determine whether the client device 102 is associated with an account authorized to view the media content broadcast 210, such as whether the account includes a subscription to a premium movie channel. In these embodiments, if the License Server 132 determines that the client device 102 does not subscribe or have access to the channel of the media content broadcast 210, the License Server 132 can be prevented from providing the region-specific media key 204 for the media content broadcast 210.

In operation, each client device 102 can use its region-specific media key 204 to unwrap the content key 206 for the media content broadcast 210 from the protected control word 202 in the region-specific playlist 200 it received. The client device 104 can use the location identifiers 208, such as URLs, within the region-specific playlist 200 to locate the encrypted chunks of the media content broadcast on the Origin Server 122, and decrypt the chunks using the unwrapped content key 206. In some embodiments, the client device 104 can access and view the media content broadcast 210 using HTTP Live Streaming (HLS).

Figure 3:
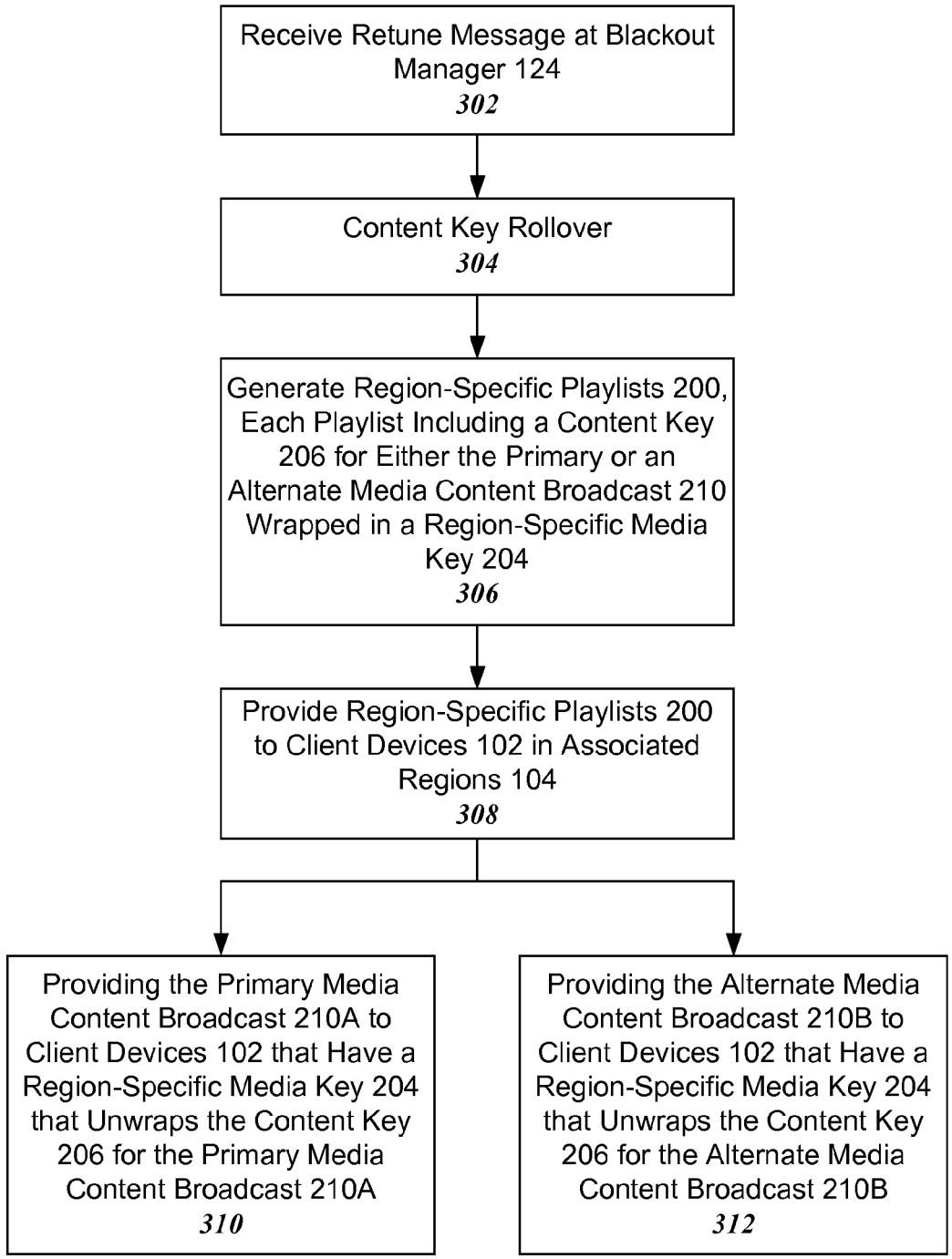
FIG. 3 depicts a method for implementing and/or controlling a blackout of a media content broadcast.

FIG. 3 depicts a method for implementing and/or controlling a blackout of a media content broadcast 210. When a provider 106 desires to have a primary media content broadcast 210A blacked out within one or more particular regions 104, the provider 106 can transmit a retune message to the Central Data Center 108. In some embodiments, retune messages can be sent in-band and received by the IRDs 116. In other embodiments, retune messages can be sent to and received by the Blackout Manager 124 directly. The retune message can include information about the primary media content broadcast 210A to be blacked out, the identity of one or more individual regions 104 in which the primary media broadcast 210A is to be blacked out, and the identity of an alternate media content broadcast 210B that is to be substituted for the primary media content broadcast 210A within the blacked-out regions 104. Client devices 102 within the blacked-out regions 104 can be given access to the alternate media content broadcast 210B, while client devices 102 within regions 104 that are not blacked-out can be given access to the primary media content broadcast 210A.

In some embodiments, the alternate media content broadcast 210B can be a different media content broadcast 210 that is also being received at the Central Data Center 108 and encrypted by the Packager 120 using a different content key 206 than the primary media content broadcast 210A. By way of a non-limiting example, a sports broadcaster such as ESPN that runs multiple channels can transmit a retune message to request that its ESPN channel be blacked out in a certain region 104 during the broadcast of a specific sporting event, and be substituted in the blacked-out region 104 with its ESPNU channel. By way of another non-limiting example, a service provider can transmit a retune message to replace a movie channel from one content provider 106 with a news channel from another content provider 106 in one or more regions 104. In some embodiments, the alternate media broadcast 210B can be a separate regular channel that remains available to client devices 102 of any region 104 on its normal channel. By way of a non-limiting example, when the ESPN channel is substituted with the ESPNU channel in a blackout region, ESPNU can remain separately available on its normal channel in addition to replacing the regular ESPN channel.

At step 302, the retune message can be received at the Central Data Center 108. At step 304, a new content key 206 can be used by the Packager 120 to encrypt chunks of the primary media content broadcast 210A. By way of a non-limiting example, the Packager 120 can roll over to a new content key 206 and use the new content key 206 to encrypt the chunks of the primary media content broadcast 210A, and send the encrypted chunks to the Origin Server 122. The Packager 120 can generate an initial playlist indicating the locations 208 of the encrypted chunks of the Origin Server 122. In some embodiments, the content key 206 for the alternate media content broadcast 210B can remain the same when the retune message is received, although in other embodiment the content key 206 for the alternate media content broadcast 210B can change when the content key 206 for the primary media content broadcast 210A changes after receipt of the retune message.

At step 306, the Playlist Rebuilder 128 can receive the initial playlist from the Playlist Builder 126, and generate region-specific playlists 200 for each region 104. For those regions 104 that are not subject to the blackout, the Playlist Rebuilder 128 can generate region-specific playlists 200 comprising the content key 206 for the primary media content broadcast 210A, wrapped in the region-specific media key 204. For those regions 104 that are subject to the blackout, the Playlist Rebuilder 128 can generate region-specific playlists 200 comprising the content key 206 for the alternate media content broadcast 210B, wrapped in the region-specific media key 204. The new content key 206 for the primary media content broadcast 210A can be different than the content key 206 for the alternate media content broadcast 210B.

FIGS. 2A and 2B depict embodiments of region-specific playlists 200. FIG. 2A depicts an embodiment of a region-specific playlist 200 for a region 104 that is not subject to a blackout, which comprises a content key 206 for the primary media content broadcast 210A wrapped in a region-specific media key 204. The content key 206 for the primary media content broadcast 210A can be the same for all regions 104 that are not subject to the blackout, while the region-specific media key 204 can be unique to each region 104. FIG. 2B depicts an embodiment of a region-specific playlist 200 for a region 104 that is subject to the blackout, the region-specific playlist 200 comprising a content key 206 for an alternate media content broadcast 210B wrapped in a region-specific media key 204. The content key 206 for the alternate media content broadcast 210B can be the same for all regions 104 that are subject to the blackout in which the alternate media content broadcast 210B was substituted for the primary media content broadcast 210B, while the region-specific media key 204 can be unique to each region 104.

At step 308, the region-specific playlists 200 can be provided to the client devices 102 within each corresponding region 104. In some embodiments, the region-specific playlists 200 can be transmitted from the Playlist Rebuilder 128 to the Origin Server 122 via the Packager 120. In alternate embodiments, the region-specific playlists 200 can be transmitted from the Playlist Rebuilder 128 directly to the Origin Server 122. The Origin Server 122 can transmit the region-specific playlists 200 to the client devices 102 through the Content Delivery Network 112, the edge caches 110, and/or the access networks 114.

At step 310, the Origin Server 122 can provide the chunks of the encrypted primary media content broadcast 210A to those client devices 104 that unwrap the content key 206 for the primary media content broadcast 210A from the region-specific playlist 200 they received. These client devices 102 can have independently received a region-specific media key 204 from the Encryption Key Manager 130 that they use to unwrap the content key 206 for the primary media content broadcast 210A from the protected control word 202 in the region-specific playlist 200. These client devices 102 can use the location identifiers 208, such as URLs, within the region-specific playlist 200 to access the encrypted chunks of the primary media content broadcast 210A on the Origin Server 122, and can decrypt the chunks using the unwrapped content key 206 to view the primary media content broadcast 210A.

Similarly, at step 312, the Origin Server 122 can provide the chunks of the encrypted alternate media content broadcast 210B to those client devices 102 that unwrap the content key 206 for the alternate media content broadcast 210B from the region-specific playlist 200 they received. These client devices 102 can have independently received a region-specific media key 204 from the Encryption Key Manager 130 that they use to unwrap the content key 206 for the alternate media content broadcast 210B from the protected control word 202 in the region-specific playlist 200. These client devices 102 can use the location identifiers 208, such as URLs, within the region-specific playlist 200 to access the encrypted chunks of the alternate media content broadcast 210B on the Origin Server 122, and can decrypt the chunks using the unwrapped content key 206 to view the alternate media content broadcast 210B.

Figure 4:
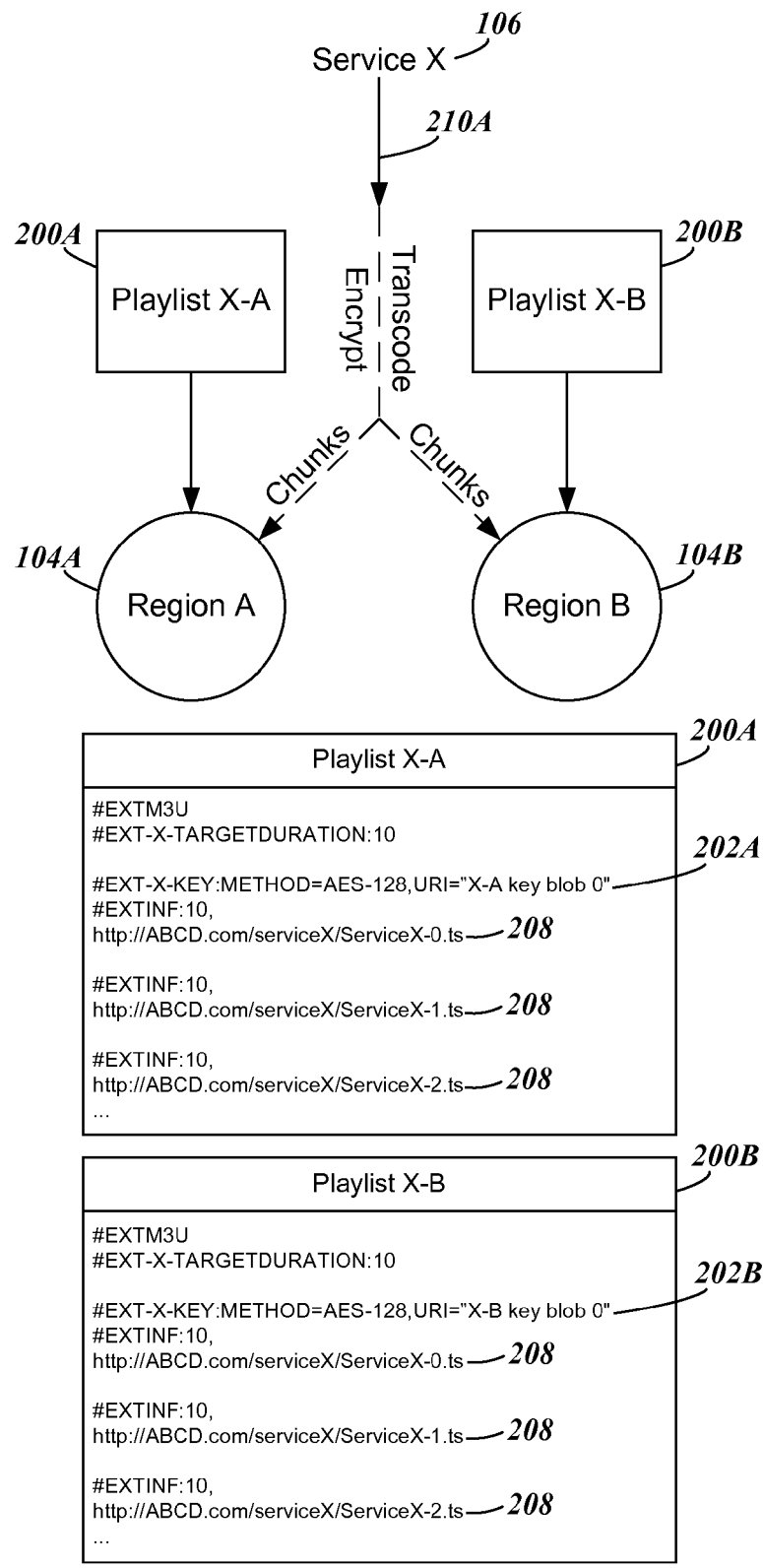
FIG. 4 depicts a non-limiting example of operation of an IPTV system when no retune message has been received and no blackout is in place.

FIG. 4 depicts a non-limiting example of operation of an IPTV system when no retune message has been received and no blackout is in place. In this example, a primary media content broadcast 210A can be received from a content provider 106, denoted as Service X. The primary media content broadcast 210A can be transcoded and encrypted at the Central Data Center 108. The Playlist Rebuilder 128 can generate a region-specific playlist 200 for each region 104. In this example, separate region-specific playlists 200 are generated for Region A and Region B. The region-specific playlists 200 can comprise different region-specific protected key words 202 that allow the client devices 102 in each region 104 to access the same content key 206 with their region-specific media keys 204. By way of a non-limiting example, for Region A the Playlist Rebuilder 128 can generate Playlist X-A comprising a protected control word 202 denoted as "X-A key blob 0." Similarly, for Region B the Playlist Rebuilder 128 can generate Playlist X-B comprising a protected control word 202 denoted as "X-B key blob 0." While "X-A key blob 0" and "X-B key blob 0" can be different because each uses a different region-specific media key 204, the different region-specific media keys 204 can wrap the same content key 206 for the primary media content broadcast 210A. Client devices 102 in each region 104 can access chunks of the primary media content broadcast 210A using the location identifiers 208 in the region-specific playlist 200. For example, the client devices 102 can access the first chunk of the primary media content broadcast 210A at the URL http://ABCD.com/serviceX/ServiceX-0.ts, as listed in the region-specific playlists 200A and 200B. The client devices 102 can decrypt each chunk of the primary media content broadcast 210A using the content key 206 unwrapped from the protected key word 202 using their own region-specific media key 204. In this example, client devices 102 in both Regions A and B can access and decrypt the same chunks of the primary media content broadcast 210A.

Figure 5:
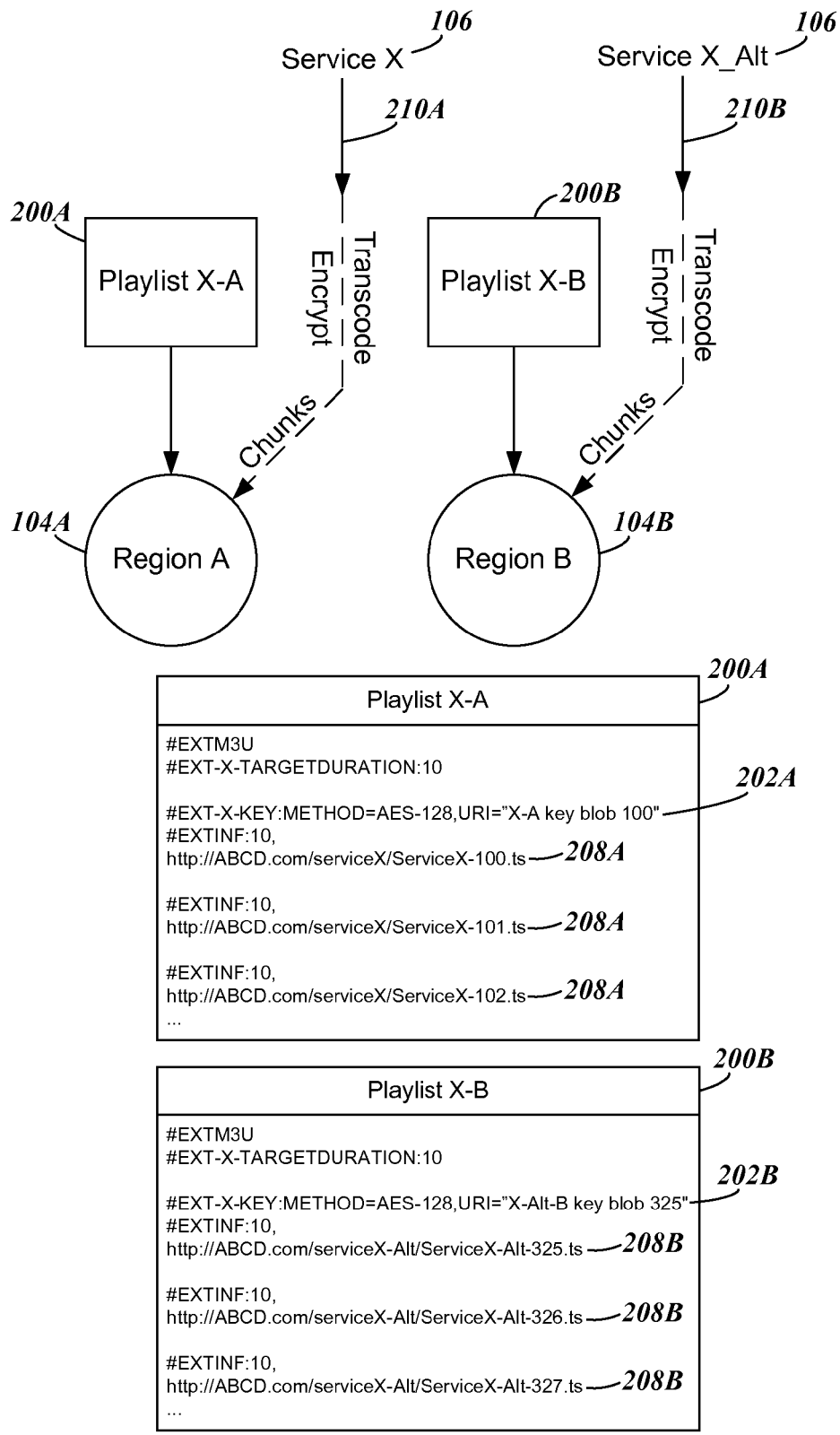
FIG. 5 depicts a non-limiting example of operation of an IPTV system after a retune message has been received and a blackout has been implemented.

FIG. 5 depicts a non-limiting example of operation of an IPTV system after a retune message has been received and a blackout has been implemented. In this example, the IPTV system can have been operating as shown in FIG. 4 until the content provider 106 Service X transmits a retune message indicating that the client devices 102 in Region B should be blacked out of accessing Service X's primary media content broadcast 210B, and the primary media content broadcast 210A should be substituted with an alternate media content broadcast 210B, denoted as Service X_Alt. The primary media content broadcast 210A and the alternate media content broadcast 210B can be transcoded and encrypted at the Central Data Center 108 using different content keys 206. The Playlist Rebuilder 128 can generate a region-specific playlist 200 for each region 104. In this example, separate region-specific playlists 200A and 200B are generated for the regions 102: Playlist X-A for Region A and Playlist X-B for Region B. The region-specific playlists 200 can comprise different region-specific protected key words 202 that allow the client devices 102 in each region 104 to access different content keys 206 with their region-specific media keys 204. In this example, because Region B is subject to the blackout, the protected control word 202 "X-Alt-B key blob 325" in Playlist X-B can comprise the content key 206 for the alternate media content broadcast 210B of Service X_Alt, and the protected control word 202 "X-A key blob 100" in Playlist X-A can comprise the content key 206 for the primary media content broadcast 210A of Service X.

In this example, client devices 102 in Region A can access chunks of the primary media content broadcast 210A using the location identifiers 208 in Playlist X-A, such as the first chunk of the primary media content broadcast 210A at the URL http://ABCD.com/serviceX/ServiceX-100.ts, as listed in Playlist X-A. Similarly, client devices 102 in Region B can access chunks of the alternate media content broadcast 210B using the location identifiers 208 in Playlist X-B, such as the first chunk of the alternate media content broadcast 210B at the URL http://ABCD.com/serviceX-Alt/ServiceX-Alt-325.ts, as listed in Playlist X-B. The client devices 102 can decrypt each chunk using the content key 206 unwrapped from the protected key word 202 using their own region-specific media key 204. In this example, client devices 102 in Region A can access and decrypt chunks of the primary media content broadcast 210A, while client devices 102 in Region B can access and decrypt chunks of the alternate media content broadcast 210B.

When a blackout has been implemented, client devices 102 in blacked-out regions 104 can be prevented from accessing and/or decrypting chunks of the primary media content broadcast 210A. For example, as shown in FIG. 5 the client devices 102 in Region B can be provided with Playlist X-B. Because Playlist X-B includes location identifiers 208 for chunks of the alternate media content broadcast 210B, the client devices 102 can be directed to the chunks of the alternate media content broadcast 210B, and the client devices 102 are not provided with the location identifiers 208 of the chunks of the primary media content broadcast 210A from Playlist X-B.

However, even if a client device 102 in a blacked-out region 104 were to obtain the location identifiers 208 of the chunks of the primary media content broadcast 210A, the client device 102 in the blacked-out region 104 can be prevented from decrypting and viewing the primary media content broadcast 210A, because the client device 102 in the blacked-out region 104 has a region-specific media key 204 that unwraps the content key 206 for the alternate media content broadcast 210B, not the primary media content broadcast 210A.

For example, as shown in FIG. 5, if a Region B client device 102 were to receive Playlist X-A, for instance from a Region A client device 102, the Region B client device 102 can be prevented from decrypting the chunks of the primary media broadcast 210A because the Region B client device 102 does not have the region-specific media key 204 that unwraps the content key 206 for the primary media content broadcast 210A. The Region B client device 102 can have a region-specific media key 204 that does not correspond to the region-specific media key 204 used in the protected control word 202 "X-A key blob 100." The Region B client device 102 would be prevented from unwrapping the content key 206 for the primary media content broadcast 210A from "X-A key blob 100" because the Region B client device 102 does not have the region-specific media key 204 used to wrap the content key 206 for the primary media content broadcast 210A within "X-A key blob 100." By way of a non-limiting example, a client device 102 in a blacked-out region 104 can be prevented from using CGI/Web proxy servers to spoof its location in order to gain access to the blacked-out media content broadcast 210.

When the blackout ends, such as at the end of the primary media broadcast 210A that was blacked-out in particular regions 104, the Playlist Rebuilder 128 can return to generating region-specific playlists 200 for each region 104 that include the same content key 206 for the next primary media content broadcast 210A, such that all client devices 102 can access the next primary media content broadcast 210A, and the alternate media content broadcast 210B is no longer substituted for the primary media content broadcast 210A. In some embodiments, blackouts can end after a set period of time specified in the initial retune message. In other embodiments, the provider can send a second retune message containing instructions to end the blackout.

Although the present invention has been described above with particularity, this was merely to teach one of ordinary skill in the art how to make and use the invention. Many additional modifications will fall within the scope of the invention, as that scope is defined by the following claims.

What is claimed:

1. A media content broadcast blackout control method, comprising:
   receiving a retune message from an IPTV provider at a central data center, said retune message comprising a request for a blackout of a primary media content broadcast in one or more of a plurality of regions;
   generating a playlist with a blackout manager for each of said plurality of regions, each said playlist comprising a content key wrapped in a region-specific media key that is specific to the region associated with said playlist, wherein said content key in the playlists for regions that are not subject to said blackout is configured to access said primary media content broadcast, and wherein said content key in the playlists for regions that are subject to said blackout is configured to access an alternate media content broadcast;
   providing said playlist associated with each of said plurality of regions to one or more client devices within each of said plurality of regions;
   providing said primary media content broadcast to one or more client devices whose region-specific media key unwraps said content key for said primary media content broadcast;
   providing said alternate media content broadcast to one or more client devices whose region-specific media key unwraps said content key for said alternate media content broadcast;
   encrypting chunks of said primary media content broadcast using said content key for said primary media content broadcast;
   storing said chunks on an origin server;
   wherein each said playlist for regions that are not subject to said blackout further comprises location identifiers for chunks of said primary media content broadcast that were encrypted using said content key for said primary media content broadcast,
   wherein each said playlist for regions that are subject to said blackout further comprises location identifiers for chunks of said alternate media content broadcast that were encrypted using said content key for said alternate media content broadcast; and
   wherein said location identifiers are uniform resource locators (URLs) pointing to locations on an origin server.

2. The media content broadcast blackout control method of claim 1, further comprising replacing said content key for said primary media content broadcast with a new content key when said retune message is received.

3. The media content broadcast blackout control method of claim 1, further comprising providing said one or more client devices with the region-specific media key corresponding to the region in which each said client device is physically located.

4. The media content broadcast blackout control method of claim 1, wherein said primary media content broadcast and said alternate media content broadcast originate from the same content provider.

5. The media content broadcast blackout control method of claim 1, wherein said primary media content broadcast and said alternate media content broadcast originate from different content providers.

6. A media content broadcast blackout control method, comprising:
   receiving a retune message from an IPTV provider, said retune message comprising a request for a blackout of a media content broadcast in at least one of a plurality of regions;
   rotating to a new content key for said media content broadcast in response to said retune message, and encrypting said media content broadcast with said new content key;
   encrypting an alternate media content broadcast with an alternate content key;
   generating a region-specific playlist for each of said plurality of regions in response to said retune message, wherein the region-specific playlist for a particular region that is subject to said blackout comprises said alternate content key wrapped in a media key that is specific to said particular region, and the region-specific playlist for a particular region that is not subject to said blackout comprises said new content key wrapped in a media key that is specific to said particular region;
   providing client devices in each of said plurality of regions with the region-specific playlist associated with the region in which the client device is located;
   de-encrypting and providing said media content broadcast to client devices that received a region-specific playlist comprising a media key that unwraps said new content key;
   de-encrypting and providing said alternate media content broadcast to client devices that received a region-specific playlist comprising a media key that unwraps said alternate content key;
   wherein each said playlist for regions that are not subject to said blackout further comprises location identifiers of said primary media content broadcast that was encrypted using said content key for said primary media content broadcast,
   wherein each said playlist for regions that are subject to said blackout further comprises location identifiers for said alternate media content broadcast that was encrypted using said content key for said alternate media content broadcast; and
   wherein said location identifiers are uniform resource locators (URLs) pointing to locations on an origin server.

7. A central data center for an Internet Protocol Television system, comprising:
   one or more integrated receiver-decoders configured to receive media content broadcasts from one or more IPTV providers;
   a packager configured to encrypt chunks of said media content broadcasts with a content key;
   an origin server configured to store said chunks after encryption;

a playlist builder configured to generate an initial playlist comprising the locations of said chunks on said origin server;

a playlist rebuilder configured to generate region-specific playlists for each of a plurality of regions, each said region-specific playlist having a protected control word comprising said content key wrapped in a region-specific media key, wherein said playlist rebuilder is:

configured to generate a blackout region-specific playlist for each of said plurality of regions that is subject to a blackout of a primary media content broadcast, each said blackout region-specific playlist comprising the content key used to encrypt chunks of an alternate media content broadcast wrapped in the region-specific media key for the region subject to said blackout;

configured to generate a non-blackout region-specific playlist for each of said plurality of regions that is not subject to said blackout of a primary media content broadcast, each said non-blackout region-specific playlist comprising the content key used to encrypt chunks of said primary media content broadcast wrapped in the region-specific media key for the region that is not subject to said blackout;

wherein each said playlist for regions that are not subject to said blackout further comprises location identifiers for chunks of said primary media content broadcast that were encrypted using said content key for said primary media content broadcast, wherein each said playlist for regions that are subject to said blackout further comprises location identifiers for chunks of said alternate media content broadcast that were encrypted using said content key for said alternate media content broadcast; and wherein said location identifiers are uniform resource locators (URLs) pointing to locations on an origin server.

8. The central data center for an Internet Protocol Television system of claim 7, further comprising a transcoder configured to multibitrate transcode the received media content broadcasts and forward the transcoded media content broadcasts to said packager.

* * * * *